United States Patent [19]
Vettraino, Jr. et al.

[11] Patent Number: 5,693,986
[45] Date of Patent: Dec. 2, 1997

[54] METHOD AND DEVICE FOR DISCONNECTING LOADS FROM A MOTOR VEHICLE BODY

[75] Inventors: Frank Vettraino, Jr., Warren; Richard L. Long, Sterling Hts.; Patrick Dean, Armada; Norman T. Caramagno, Metamora, all of Mich.

[73] Assignee: Chrysler Corporation, Auburn Hills, Mich.

[21] Appl. No.: 823,093

[22] Filed: Mar. 24, 1997

Related U.S. Application Data

[63] Continuation of Ser. No. 489,576, Jun. 12, 1995, abandoned.
[51] Int. Cl.$^6$ ....................................... H02J 1/00
[52] U.S. Cl. ............... 307/10.7; 307/10.1; 364/424.059; 315/83; 320/13; 340/458; 340/457; 340/457.2
[58] Field of Search ..................... 307/9.1, 10.1, 307/10.3, 10.6, 10.7, 10.8, 38, 39, 40, 125, 126, 130, 131, 132 E, 140, 141, 141.4, 11, 157; 320/13, 30, 32, 33, 39, 40; 340/455, 636, 660, 644, 458, 457.2, 457; 315/82, 83, 77; 364/707, 424.045, 423.098, 424.059, 492

[56] References Cited

U.S. PATENT DOCUMENTS

| | | | |
|---|---|---|---|
| 4,128,717 | 12/1978 | Shuster | 361/79 |
| 4,578,591 | 3/1986 | Floyd et al. | 307/10.1 |
| 4,608,637 | 8/1986 | Okuyama et al. | 364/424.05 |
| 4,855,710 | 8/1989 | Kikuchi et al. | 307/10.3 |
| 4,890,231 | 12/1989 | Frantz | 364/424.04 |
| 5,089,762 | 2/1992 | Sloan | 307/10.7 |
| 5,136,230 | 8/1992 | Gayler | 320/13 |
| 5,148,722 | 9/1992 | Mehta | 74/866 |
| 5,153,558 | 10/1992 | Robinson et al. | 307/10.7 |
| 5,204,992 | 4/1993 | Carpenter | 307/10.7 |
| 5,257,190 | 10/1993 | Crane | 364/424.03 |
| 5,289,043 | 2/1994 | Marshall et al. | 307/38 |
| 5,473,306 | 12/1995 | Adell | 307/10.8 |
| 5,481,253 | 1/1996 | Phelan et al. | 307/10.6 |
| 5,497,322 | 3/1996 | Kolomyski et al. | 364/424.03 |
| 5,504,377 | 4/1996 | Nowell | 307/10.7 |

*Primary Examiner*—William M. Shoop, Jr.
*Assistant Examiner*—Peter Ganjian
*Attorney, Agent, or Firm*—Mark P. Calcaterra

[57] ABSTRACT

A battery protection device disconnects vehicle electronic components from a motor vehicle battery to prevent a full discharge thereof including a plurality of switches switchable between ON and OFF positions, and a control unit electrically connected to each of the switches and capable of switching each of the switches between the ON and OFF positions individually.

16 Claims, 2 Drawing Sheets

METHOD AND DEVICE FOR DISCONNECTING LOADS FROM A MOTOR VEHICLE BODY

CROSS-REFERENCE TO RELATED APPLICATION

This application is a continuation of application Ser. No. 08/489,576, titled "Method and Device for Disconnecting Loads from a Motor Vehicle Battery" filed Jun. 12, 1995 by the same inventors as in the present application now abandoned.

BACKGROUND OF THE INVENTION

1. Field of the Invention

The present invention relates generally to loads on a battery in a motor vehicle and, more particularly, to a method and device for disconnecting loads from a battery in a motor vehicle.

2. Description of the Related Art

Drivers of motor vehicles are frequently confronted with a dying or dead battery. A dead battery is often the result of a load being accidently connected to the battery, e.g., accidentally leaving on headlights, glove box light or interior dome light. Additionally, modern electronic components found on motor vehicles can drain the battery to the point where the battery cannot start the engine of the motor vehicle.

One attempt to avoid the above is to have a circuit breaker system which disconnects non-critical accessories when the charge of the battery drops below a predetermined level as measured by a voltmeter. The circuit breaker system also has an override switch allows the operator of the vehicle to reconnect the non-critical accessories. The circuit breaker system receives a disabling signal when the engine is running so as not to disconnect the non-critical accessories during the operation of the vehicle.

This circuit breaker system does not, however, automatically alert the operator of the motor vehicle of battery disconnections when the operator tries to start the motor vehicle. Further, disconnection of the battery is not desirable because modern electronic components found on these motor vehicles may be adaptive and when electricity is disconnected from these components, these components must return to their default parameters. Also, some electronic components in the motor vehicle lose their programming when electricity is disconnected therefrom.

SUMMARY OF THE INVENTION

It is, therefore, one object of the present invention to provide a method and device for disconnecting loads from a battery of a motor vehicle.

It is another object of the present invention to disconnect only those loads which remain on after the operator has exited the vehicle.

It is yet another object of the present invention to reconnect all of the loads that were disconnected upon the operator entering the vehicle.

To achieve the foregoing objects, the present invention is a device for disconnecting loads from a motor vehicle battery to prevent a full discharge thereof. The device includes a plurality of switches switchable between ON and OFF positions. Each of the switches is electrically connected to one of the loads. The device further includes a control unit electrically connected to each of the switches. The control unit produces signals to individually switch each of the switches between the ON and OFF positions.

One advantage of the present invention is that a method and device is provided for disconnecting loads from a motor vehicle battery. Another advantage of the present invention is that the method and device has the ability to disconnect certain electronic components that are inadvertently left ON while maintaining the remaining electronic components electrically connected to the motor vehicle battery. A further advantage of the present invention is that the method and device reconnects the electronic components upon the return of the operator to the motor vehicle, rendering the operator a fully functional motor vehicle with a charged battery.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
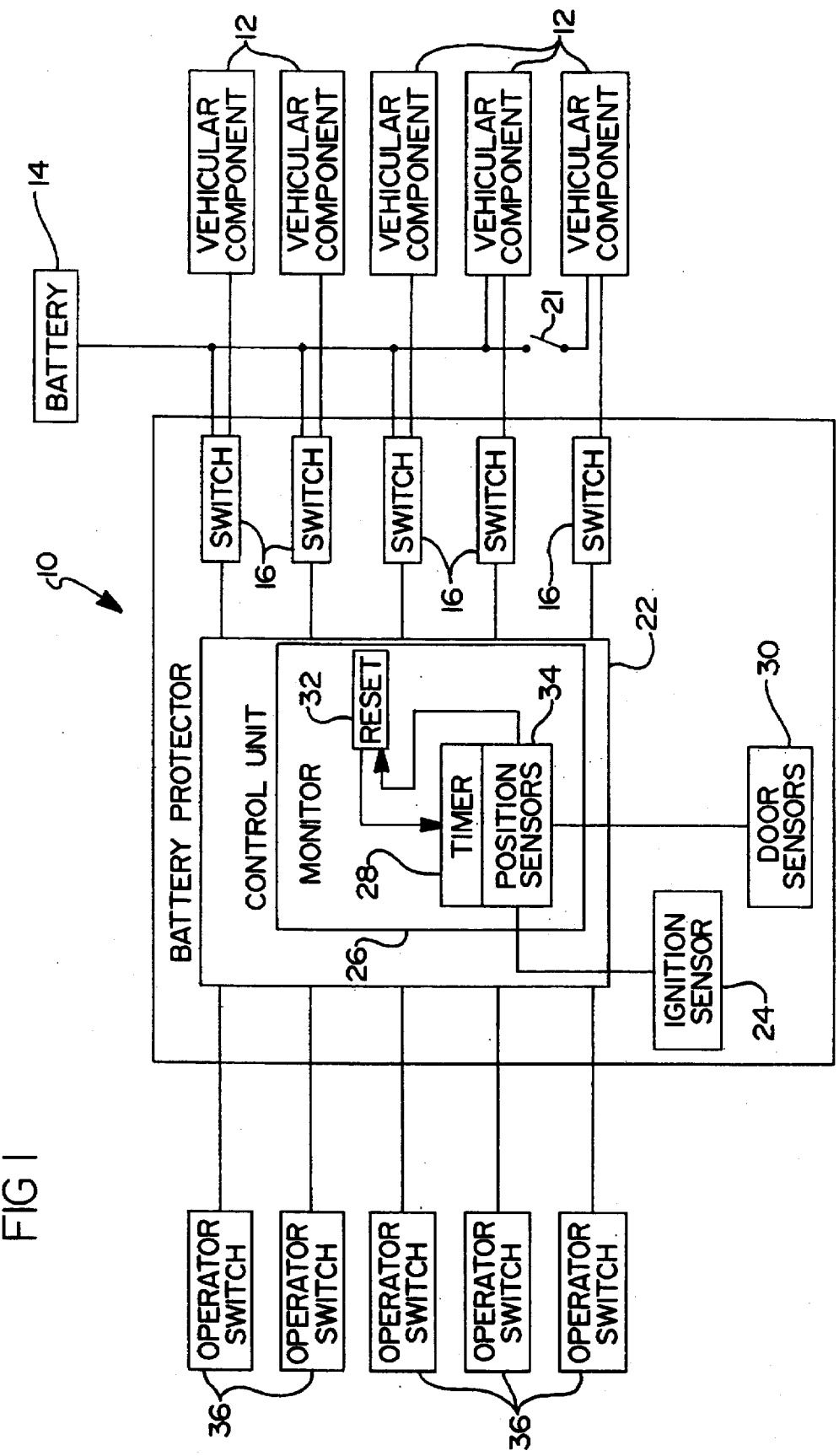
FIG. 1 is a block diagram of a device, according to the present invention, for disconnecting loads from a motor vehicle battery.
Figure 2:
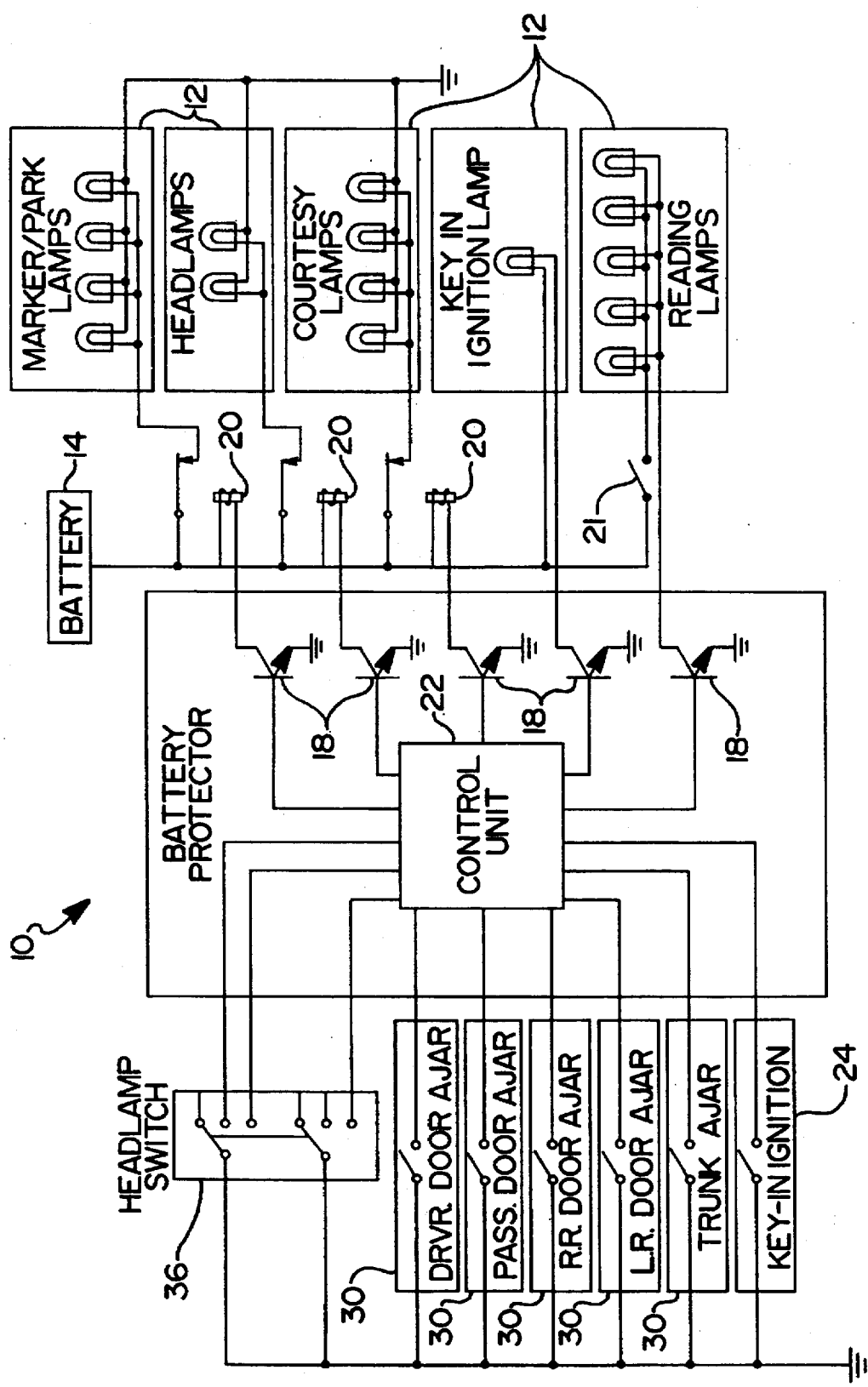
FIG. 2 is a circuit schematic of the device of FIG. 1.

Referring to FIGS. 1 and 2, a battery protection device is generally shown at 10. The battery protection device 10 disconnects loads such as electronic components 12 from a battery 14 of a motor vehicle (not shown). The electronic components 12 are typically non-essential loads electrically connected to and placed on the battery 14. A non-exhaustive list of electronic components 12 in the motor vehicle include, but are not limited to, marker/park lamps, head lamps, courtesy lamps, key-in ignition lamps, reading lamps, glovebox lamps, visor vanity lamps, and the like. For illustrative purposes, only five (5) electronic components 12 in the motor vehicle are shown in FIGS. 1 and 2. It should be appreciated that the battery protection device 10 disconnects the electronic components 12 to prevent a full discharge of the battery 14.

The battery protection device 10 includes a plurality of switches 16 which are switchable between ON and OFF positions. Each of the switches 16 is electrically connected to one of the electronic components 12 in the motor vehicle. Each of the switches 16 includes a transistor 18. Some of the switches 16 may include a relay 20 which is electrically connected to corresponding transistors 18, the battery 14, and corresponding electronic components 12. The switches 16 which include the relays 20 operate differently than the switches 16 which do not include the relays 20. More specifically, the switches 16 which include the relays 20 disconnect their corresponding electronic components 12 from the battery 14. The switches 16 which lack the relays 20 do not disconnect their corresponding electronic components 12 from the battery 14, but merely disconnect the electronic components 12 from ground, thereby preventing current from passing through the electronic components 12. Examples of the electronic components 12 in the motor vehicle which typically are not used with relays are the key-in dash ignition lamp and the reading lamps. In particular, the courtesy lamp electronic component 12 may use a FET transistor in place of the NPN transistor/relay combination so that the FET transistor may slowly dim the courtesy lamp as opposed to abruptly turning it OFF as the transistor/relay combination does. Also, the lamp electronic component 12 may include an operator selectable switch 21 (FIG. 2). It should be appreciated that the differences between the two types of switches 16 relate to the load capacity of the transistors 18.

The battery protection device 10 further includes a control unit 22 which is electrically connected to each of the switches 16. The control unit 22 produces signals to individually switch each of the switches 16 between ON and OFF positions. Because the control unit 22 is capable of determining which electronic component 12 in the motor vehicle is ON, the control unit 22 is capable of turning each of the electronic components 12 OFF after a predetermined time as established by software in the control unit 22. Therefore, the control unit 22 is capable of turning each of the electronic components 12 OFF individually based on how much time each of the switches 16 associated with the operating electronic components 12 had been in the ON position.

The battery protection device 10 also includes an ignition sensor 24 electrically connected to the control unit 22 to determine if an ignition key is inserted into the ignition (not shown) of the motor vehicle. If the ignition key is inserted into the ignition, the control unit 22 will automatically disable the switches 16, allowing the electronic components 12 to continuously receive electricity from the battery 14. In this way, the operator of the motor vehicle can stay inside the motor vehicle with uninterrupted use of the electronic components 12 even if the electronic components 12 are ON longer than the predetermined time designated for that particular electronic component 12 without losing power thereto. More specifically, by placing the ignition key in the ignition, the ignition sensor 24 senses the presence of the operator of the motor vehicle and will not override the discretion of the operator.

The control unit 22 includes a monitor 26 which monitors the position of each of the switches 16. The monitor 26 includes a timer 28 to measure an amount of time each of the switches 16 is in the ON position. The timer 28 starts measuring time when the ignition sensor 24 senses the absence of the ignition key. The battery protection device 10 includes a plurality of door sensors 30 which sense the position of each of the doors of the motor vehicle. If any of the doors open or, if the ignition key is inserted into the ignition, a reset subcircuit 32 of the control unit 22 will reset the timer 28 to start timing again when the ignition key is removed from the ignition.

The control unit 22 also includes position sensors 34 to sense the position of each of a plurality of operator switches 36 electrically connected thereto. The operator switches 36 are movable between at least two positions and associated with each of the electronic components 12. More specifically, each of the electronic components 12 have at least one operator switch 36. Each of the position sensors 34 detects the position of the corresponding operator switch 36 to determine when the corresponding electronic component 12 is operating.

Referring to FIG. 2, the battery protection device 10 may be fabricated from a single integrated circuit chip. In one embodiment, the battery protection device 10 is designed to operate using one of a family of integrated circuits manufactured by Motorola, Austin, Tex., wherein the model no. is MCG8HC11. For different types of motor vehicles, the integrated circuit chips identified by the product numbers MCG8HC11A8 and MCG8HC11E9 are known to operate well.

In operation, a method, according to the present invention, for disconnecting the electronic components 12 of the motor vehicle from the battery 14 includes the steps of sensing the position of the individual operator switches 36, timing a length of time the individual operator switches 36 are in an ON position, and disconnecting one of the electronic components 12 from the battery 14 when the length of time the individual operator switch 36 associated with the one of the electronic components 12 is in the ON position a predetermined time. Because the control unit 22 is capable of discerning which of the electronic components 12 is ON, the control unit 22 can disconnect each of those electronic components 12 individually when the predetermined time associated with that particular electronic component 12 has lapsed. The control unit 22 is capable of turning OFF different electronic components 12 of the motor vehicle at different times, e.g., the courtesy lamps after fifteen (15) minutes and the headlights after three (3) minutes.

The method further includes the step of determining or sensing whether an ignition key has been inserted into the ignition. If a key is sensed, the control unit 22 will be inhibited from operating as the presence of an ignition key indicates the operator of the motor vehicle is present and wishes to utilize the electronic components 12.

The method includes the step of stopping the step of timing how long an operator switch 36 is in the ON position upon receipt of a signal representing the occurrence of a predetermined condition. The signal representing the occurrence of a predetermined condition is either a door opening (including the trunk/liftgate) or the insertion of an ignition key into the ignition. Once the predetermined condition has occurred, the step of resetting the timer 28 occurs. In addition to resetting the timer 28, all of the electronic components 12 of the motor vehicle are reconnected with the battery 14 after the predetermined condition occurs.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A device for disconnecting loads from a motor vehicle battery to prevent a full discharge thereof, said device comprising:

a plurality of switches switchable between an ON position and OFF position, each of said switches being electrically connected to one of the loads; and a control unit electrically connected to each of said switches, said control unit producing signals to individually switch each of said switches from said ON position to said OFF position based on predetermined times each of said switches had been in said ON position;

an ignition sensor electrically connected to said control unit to sense the presence or absence of an ignition key; and said control unit including a monitor to measure the predetermined times when said ignition sensor senses the absence of the ignition key.

2. A device as set forth in claim 1 wherein said monitor includes a timer to measure an amount of time each of said switches is in said ON position.

3. A device as set forth in claim 1 wherein said monitor further includes a plurality of position sensors each associated with one of said switches, each movable between at least two positions and associated with one of the loads.

4. A device as set forth in claim 2 wherein said control unit further includes a reset subcircuit to reset said timer.

5. A device as set forth in claim 1 wherein each of said switches includes a transistor.

6. A device as set forth in claim 5 wherein each of a portion of said switches further includes a relay electrically connected to one of said transistors, the battery, and one of the loads.

7. A battery protection device for disconnecting vehicle electronic components from a motor vehicle battery to prevent a full discharge thereof, said battery protection device comprising:

a plurality of switches switchable between an ON position and OFF position, each of said switches being electrically connected to one of the vehicle electronic components, a portion of said switches including relays, each of said relays associated with each of said portion of said switches;

a control unit electrically connected to said switches, an ignition sensor electrically connected to said control unit to sense the presence or absence of an ignition key, said control unit including a timer to measure an amount of time each of said switches is in said ON position when said ignition sensor senses the absence of the ignition key, said control unit further including a reset subcircuit for resetting said timer at a predetermined occurrence, said control unit producing signals to individually switch each of said switches from said ON position to said OFF position based on the measured amount of time each of said switches is in said ON position.

8. A battery protection device as set forth in claim 7 wherein said control unit further includes a monitor to monitor said positions of each of said switches.

9. A battery protection device as set forth in claim 8 wherein said monitor further includes a plurality of position sensors each associated with one of a plurality of operator switches each movable between at least two positions and associated with one of the vehicle electronic components.

10. A battery protection device as set forth in claim 1 wherein each of said switches includes a transistor.

11. A method for disconnecting vehicle components from a motor vehicle battery wherein the vehicle components are controllable by individual operator switches, said method comprising the steps of:

sensing the absence of an ignition key;

sensing an ON position of the individual operator switches;

timing a length of time the individual operator switches are in the ON position; and disconnecting one of the vehicle components from the vehicle battery by switching the individual operator switch associated therewith from the ON position to an OFF position when the length of time the individual operator switch associated with the one of the vehicle components is in the ON position a predetermined time period.

12. A method as set forth in claim 11 including the step of sensing an ignition to determine whether an ignition key is inserted in the ignition.

13. A method as set forth in claim 12 further including the step of stopping the step of timing upon receipt of a signal representing the occurrence of a predetermined condition.

14. A method as set forth in claim 13 further including the step of resetting a timer.

15. A method as set forth in claim 14 further including the reconnecting each of the vehicle components after the predetermined condition occurs.

16. A method as set forth in claim 15 further including the step of setting a different length of time for each of the vehicle components.

* * * * *